United States Patent [19]

Fisher

[11] Patent Number: 4,538,129
[45] Date of Patent: * Aug. 27, 1985

[54] MAGNETIC FLUX-SHIFTING ACTUATOR

[76] Inventor: Richard T. Fisher, 149 Barker St., Pembroke, Mass. 92359

[*] Notice: The portion of the term of this patent subsequent to Sep. 13, 2000 has been disclaimed.

[21] Appl. No.: 394,475

[22] Filed: Jul. 1, 1982

Related U.S. Application Data

[63] Continuation of Ser. No. 264,365, May 18, 1981, Pat. No. 4,403,765, which is a continuation of Ser. No. 97,079, Nov. 25, 1979, abandoned.

[51] Int. Cl.$^3$ .................... H01F 3/12; F16K 31/08
[52] U.S. Cl. .................... 335/230; 335/236; 335/266; 251/65; 251/139; 137/625.65
[58] Field of Search ............ 251/65, 129, 141, 139; 137/625.65; 335/230, 236, 266

[56] References Cited

U.S. PATENT DOCUMENTS

| | | | |
|---|---|---|---|
| 3,203,447 | 8/1965 | Bremner et al. | 251/65 X |
| 3,368,788 | 2/1968 | Padula | 251/141 X |
| 3,379,214 | 4/1968 | Weinberg | 251/141 X |
| 3,458,769 | 7/1969 | Stampfli | 251/30 X |
| 3,809,123 | 5/1974 | Heimann | 251/141 X |
| 3,814,376 | 6/1974 | Reinicke | 251/141 X |
| 4,253,493 | 3/1981 | English | 137/625.5 X |

*Primary Examiner*—Arnold Rosenthal
*Attorney, Agent, or Firm*—Parmelee, Bollinger & Bramblett

[57] ABSTRACT

A magnetic flux-shifting or magnetic latch valve includes a first flux path including a first permanent magnet having a large coercive force so that its polarity cannot readily be altered. It further includes a second flux path including a second permanent magnet having a small coercive force so that its polarity can be altered. A valve according to this invention further includes a d-c source and a winding energized by said d-c source for altering the polarity of said second magnet.

The fluid valve includes a valve element and a valve seat cooperating with the valve element. The valve has two limit positions, i.e. fully open and fully closed. In the fully closed position the pole surfaces of magnetic flux paths have the same magnetic polarity and hence do not attract each other permitting gravity, spring or hydrostatic means to form a gap therebetween. However, in the fully open position the pole surfaces of the magnetic flux paths have opposite magnetic polarities and hence attract each other, closing the aforementioned gap. To put it in other words, in the fully open position of the valve, the two magnets of the valve establish two parallel flux paths, while in the closed position of the valve the magnetic flux paths of both magnets are in series.

The above structure makes it possible to operate the valve by mere d-c pulses, thus distinguishing from flux-shift valves that require sustained currents for maintaining the valve in one of its limit positions.

7 Claims, 2 Drawing Figures 4,538,129

MAGNETIC FLUX-SHIFTING ACTUATOR

This application is a continuation of my copending application Ser. No. 264,365 filed May 18, 1981, now U.S. Pat. No. 4,403,765, dated Sept. 13, 1983 which is a continuation of parent application Ser. No. 97,079 filed Nov. 25, 1979, now abandoned.

BACKGROUND OF THE INVENTION AND PRIOR ART

This invention relates to magnetic flux-shifting fluid valves. In valves of this description the shifting of a magnetic flux causes the movable valve element to move from one of its limit positions to the other of its limit positions.

The oldest type of magnetic flux-shifting fluid valves called for two magnetizing windings to effect required flux-shift and were bulky for this reason.

A flux-shifting fluid valve was suggested that required but one magnetizing winding, and furthermore had the advantage that moving the valve element from one of its limit positions to the other of its limit positions was effected by a magnetic pulse, and the valve element was thereafter held in its respective limit position by the latching action of a permanent magnet. This magnetic flux-shifting valve suffered, however, from the drawback of being unstable, i.e. mechanical vibrations or shock moved the valve element toward the permanent magnet and caused the valve element to stay close to the permanent magnet, while it was supposed to stay in a position remote from the permanent magnet.

An improvement of the above referred-to magnetic flux-shifting valve was suggested in U.S. Pat. No. 3,458,769; 07/29/67 to Harald Stampfli for "ELECTRICALLY CONTROLLED VALVE". To move the valve element upwardly, Stampfli applies a first d-c magnet winding having just sufficient ampere-turns to attract the valve element, or plunger, and magnetize the permanent magnet enough to hold the plunger, after removal of the attracting ampere-turns of the first magnet winding. A second d-c pulse in the same magnet coil is needed to get the permanent magnet sufficiently strong to keep the valve element safe in position. Releasing the plunger and/or avoidance of false closure is effected by demagnetizing the permanent magnet. This is accomplished by applying by means of an additional magnet winding ampere-turns of opposite direction, or opposite polarity, and of such lesser magnitude as to make it impossible to attract the armature, or plunger, and/or to remagnetize the permanent magnet in opposite polarity.

Stampfli thus discloses a magnetic flux-shifting valve that is potentially free from susceptibility to failure by mechanical shock, vibrations, and pressure transients at the price of introducing a susceptibility to failure when electrical parameters vary.

Other pertinent prior art is disclosed in U.S. Pat. No. 3,203,447; 08/31/65 to W. C. Bremer et al for "MAGNETICALLY OPERATED VALVE" and in U.S. Pat. No. 3,368,788; 02/13/68 to L. D. Padula for "MAGNETIC LATCH VALVE".

The first mentioned valve shows an over center toggle response which is the result of a movable permanently magnetized armature, or plunger, system whose limit positions couple attractively to either of two sections of an electromagnet with two equal limbs forming separate flux return paths, of which either one can complete the circuit if the armature is brought close thereto. This design can be made to work efficiently, but if a shock or transient fluid pressure peak in the absence of any holding current in the coil accidentally moves the armature or plunger to the opposite limit position, or even past center in that direction, the armature will then proceed to and remain at the wrong limit position.

The second mentioned valve, no less than that of Stampfli, provides reasonably secure freedom from false positioning due to shock or transient pressures. It, however, achieves this as a result of providing two permanent magnetic elements, one operationally unalterable and the other remagnetized in opposite polarity each time the valve position is changed. These two magnetic elements are required to be "chosen so they both establish the same flux levels in their remanent states". It is this equality of flux levels which purports to eliminate any holding flux in the armature and working air gap under the operating conditions calling for armature release. While such an equality of two fluxes can be achieved experimentally, it is practically compromised in in many ways, including, but not limited to, the following: manufacturing variations in the constituent magnetic properties of two totally different magnetic materials; dimensional variations in any part of the two magnetic circuits which include the said magnets, and particularly in any air gaps at joints; variations in temperature effects on the strength of the two different permanent magnets; the effect of stray magnetic fields or of proximate ferro-magnetic structures or machine parts, whose effect in modifying the field strengths of the two magnets may differ. If as a consequence of an accumulation of perturbation of the desired equality of flux levels some armature flux remains in the air gap, its attractive force will reduce the effectiveness of the return spring in returning the armature against the resistance either of fluid pressure or accidental friction. In extreme cases such undesired armature-air gap flux might even prevent release completely.

Besides the above susceptibility to operating difficulties, the structure of U.S. Pat. No. 3,368,788 has the further disadvantage of requiring for efficient operation a second coil surrounding the armature and air gap, in addition to the one for remagnetizing the appropriate permanent magnet.

Objects of the present invention accordingly include the following:

1. To provide an improved magnetic latch valve;
2. To provide magnetic latch valves which are free from the disadvantages and/or drawbacks of the prior art latch valves;
3. To provide a flux-shifting fluid valve which, when inadvertently moved from a desired state to a second state, will not remain in the second state, but will spontaneously return to the desired state, even when operating current is absent from the flux shifting winding;
4. To achieve said freedom from inadvertent perturbability without requiring precise mechanical or magnetic dimensions or quantities;
5. To achieve the foregoing with only a single winding location;
6. To achieve magnetically efficient operation such that the valve may be operated with momentary current pulses or may be left energized for long periods with voltages at the high limits of any particular coil rating without undue temperature rise;
7. To provide an integral valve structure performing both the function of controlling the flow of fluids and of being operated magnetically by flux-shift rather than a composite valve comprising a magnetic drive for valve means controlling the flow of fluids;

8. To provide a valve that includes two permanent magnets, one having a relatively high coercive force and the other having a relatively low coercive force, and of changing the magnetization of the latter in such a way that the fluxes of the two magnets are either in series across the working air gap, or in parallel through a diverting shunt path, but that the permanent magnet having the relatively low coercive force is never left demagnetized.

DESCRIPTION OF PREFERRED EMBODIMENT

Figure 1:
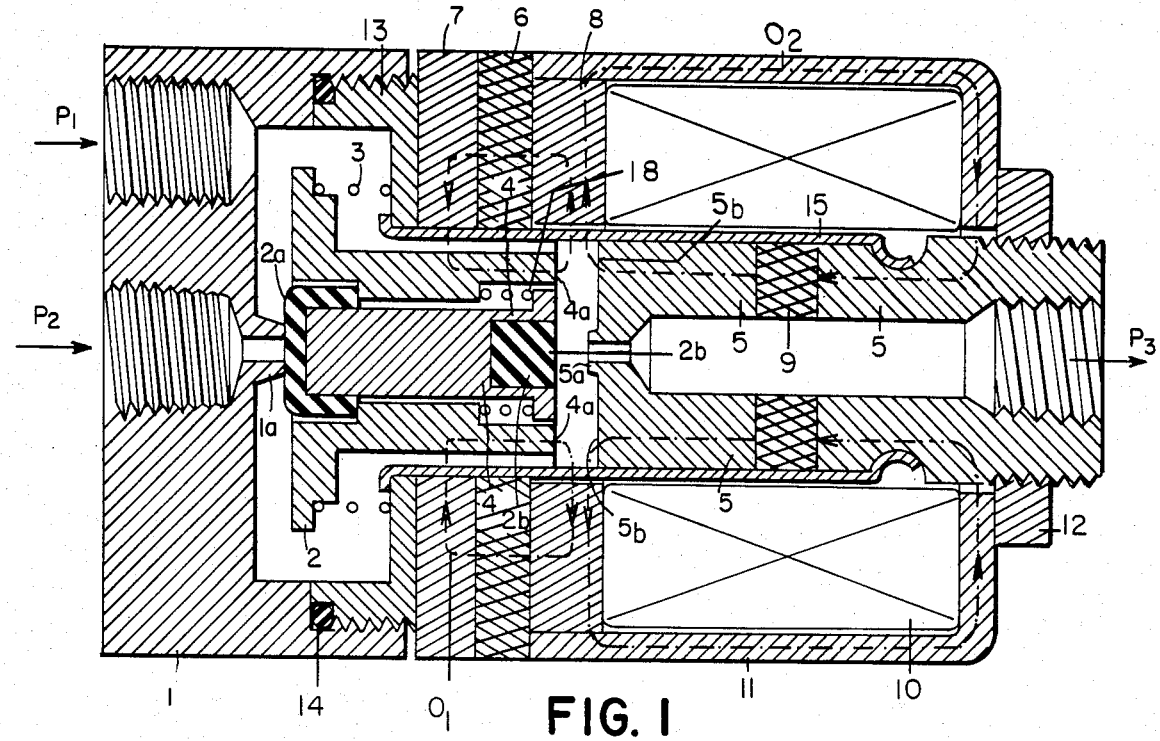
FIG. 1 is substantially a longitudinal section of a valve embodying the invention in one of its operating positions, i.e. its closed position.

Referring now to the drawings, numeral 1 has been applied to indicate the base of a three way valve having three ports $P_1$, $P_2$, $P_3$. Numeral 2 has been applied to indicate generally the armature or the plunger which is biased by spring 3 from right to left. Valve base 1 is provided with a valve seat 1a which cooperates with valve element 2a formed by the left side of armature or plunger 2. Valve element 2a is of a resilient material as generally used for valve elements. The armature 2 is substantially cylindrical and consists of soft iron to be readily magnetized. It forms the annular pole surface 4a. In the three way valve illustrated, armature or plunger 2 has a filler member 4 and forms a second valve element 2b that cooperates with valve seat 5a formed by part 5 of soft iron. In a two way valve according to the present invention port $P_3$ would be permanently closed or absent, and valve element 2b, seat 5a and related parts could be omitted. A first permanent annular magnet 6 having a relatively large coercive force is arranged around pole face 4a in coaxial relation thereto. Parts 7 and 8 are soft iron pole shoes arranged to opposite end surfaces of permanent magnet 6 which end surfaces form its poles. Soft iron part 5 forms a pole surface 5b intended to cooperate with pole surface 4a or part 2 as will be shown below in greater detail. Permanent magnet 6 has such a large coercive force that the polarity of pole surface 4a cannot be changed by any operation of the valve, i.e. it is permanently "north", or permanently "south".

Soft iron part 5 is formed of two separate parts 5 of which each is located to opposite sides of a permanent magnet 9 which has a relatively low coercive force so that it can be magnetized in either direction by means of applying ampere turns in one or the other direction in magnet coil 10. Magnet coil 10 can be energized by a source of d-c current (not shown). This source can take various forms. It can, for instance, be a battery that can be connected in either polarity to coil or winding 10; or it can be a source producing single pulses of d-c current in either direction. Yet again it may be rectified AC. Or two or more winding sections may occupy the space assigned to coil 10, each selectively operated from different current sources providing desired ampere turns and polarity. Coil 10 is enclosed by a casing part 11 which is of soft iron because it forms the path of a magnetic flux that crosses the pole piece 5b. In a three way valve parts 5, 9, 5 define a passageway for for a flow of fluid that flows out of the valve by exit port $P_3$. The right part 5 is screw-threaded and clamped against housing 11 by means of a screw-threaded nut 12. A screw-threaded part 13 mates the screw threads in valve base 1. Part 13 is also sealed by means of "O" ring 14, or the like fluid seal. Helical spring 18 is interposed between parts 2 and 4, its purpose being to allow valve element 2b to seat against valve seat 5a, then yield sufficiently to allow plunger 2 to follow through until pole surface 4a seats on pole surface 5b. (Spring 18 and part 4 would not be needed in a two way valve.) Tubular member 15 engages with its right circularly bent end a groove in the right soft iron member 5, and is thus (or alternatively by welding) tightly affixed to the latter. The left part of member 15 is welded or otherwise integrally attached to part 13. Parts 13, 15 and 5 thus form a conduit from the cavity above ports $P_1$ and $P_2$ to port $P_3$ when port $P_3$ is required. This conduit is closed by element 2b when the latter engages seat 5a, but a clear fluid passageway then exists between ports $P_1$ and $P_2$. When on the other hand element 2a closes seat 1a, fluid re-entering the aforementioned cavity from port $P_1$ is, in the three way arrangement, allowed to flow to the gap formed between pole surfaces 4a and 5b, and from there to the gap formed between valve element 2b and valve seat 5a, and from there through the fluid passageway formed by parts 5 and magnet 9 to exit port $P_3$. This has been shown in FIG. 1 showing valve seat 1a closed by valve element 2a and valve seat 5a opened by valve element 2b.

Figure 2:
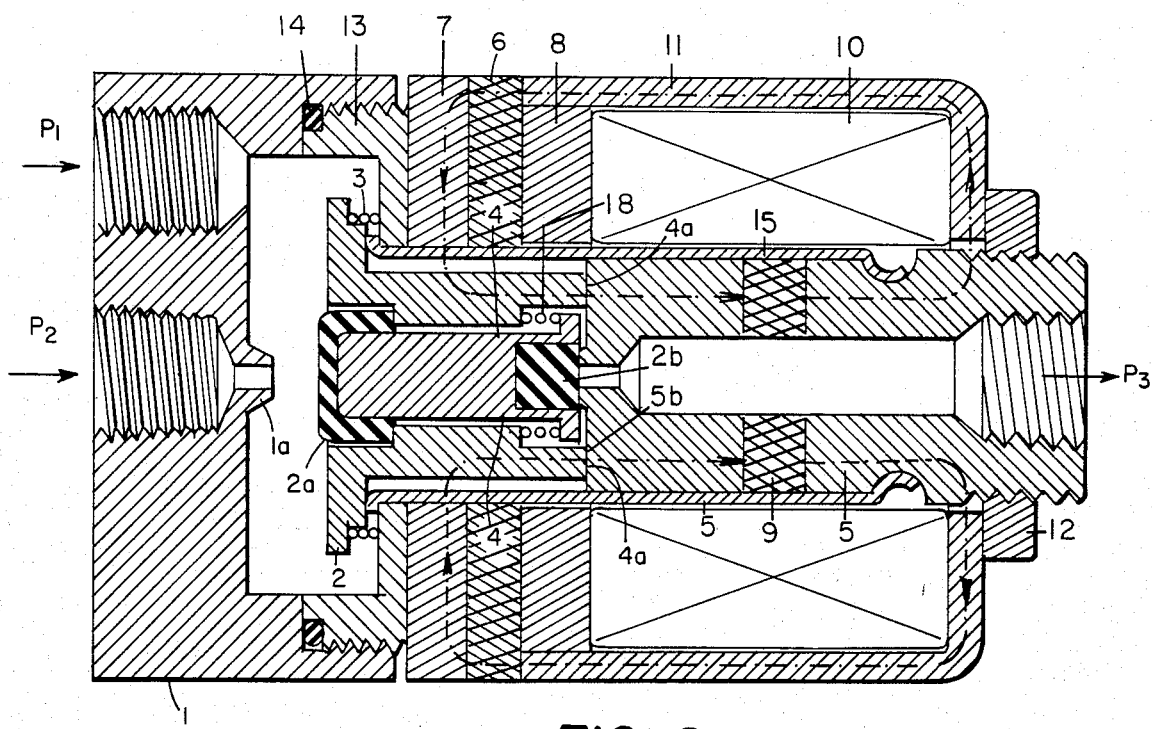
FIG. 2 shows the valve of FIG. 1 in the other of its operating positions, i.e. its open position.

In the open position of the valve which is shown in FIG. 2 valve element 2a has parted from valve seat 1a and valve element 2b engages valve seat 5a.

FIG. 1 shows diagrammatically the magnetic flux path $0_1$ established by magnet 6 and the magnetic flux path $0_2$ established by magnet 9. Pole surfaces 4a and 5b are of like polarity and hence do not attract each other which allows helical spring 3 to withdraw plunger 2 and valve element 2b from valve seat 5a. The magnetic fluxes $0_1$ and $0_2$ are separate and parallel as shown in FIG. 1.

The ampere turns of coil 10 are sufficient to reverse the polarity of magnet 9 when coil 10 is energized in opening direction by a direct current, either for a short time, e.g. by a d-c pulse, or for a long time, e.g. by a battery. When coil 10 is thus energized, this results in a complete demagnetization of magnet 9 and a re-magnetization in the opposite direction as shown in FIG. 2. FIG. 2 also shows that upon changing of the polarity of magnet 9 the flux paths $0_1$ and $0_2$ becomes serially related. Pole surfaces 4a and 5b have unlike polarity and attract each other against the bias of spring 3 which is compressed. Valve element 2b engages valve seat 5a in the three way arrangement, obstructing the fluid passageway including exhaust port $P_3$. Fluid is free to pass through ports $P_1$ and $P_2$ in either direction in both the two way and three way arrangement.

The fluid passageway extending from the cavity at the left side of FIGS. 1 and 2 to pole surface 4a, i.e. the fluid passageway along armature 2, may also be formed by one or several grooves in armature 2, or by a zone of restricted cross-section extending along armature 2.

Both magnets 6 and 9 are preferably annular and polarized in such a way that their end surfaces are pole surfaces of opposite polarity. While this is the preferred form of embodying the present invention, magnet 6 may be substituted by one or several bar magnets, and the same applies also to magnet 9.

While I have illustrated a three-way valve as an embodiment of my invention, it will be apparent that the same is applicable to two-way valves, or other valves.

The state of the valve shown in FIG. 1 may also be referred to as the 37 de-actuated" state thereof, wherein the pole surfaces 4a, 5b facing each other are of like polarity. The state of the valve shown in FIG. 2 may also be referred to as the "actuated" state, wherein the pole surfaces 4a, 5b facing each other are of opposite polarity due to the action of winding 10 and magnet 9. Magnet 9 is never de-magnetized, but successively re-magnetized in alternate direction.

Parts 2, 2a, 3, 4, 5, 6, 7, 8, 9, 10, 11, 12, 13, 14 and 18 are arranged in coaxial relation. The outer diameters of magnet 6 and winding 10 are approximately the same as also the inner diameter of magnet 6 and the inner diameter of winding 10.

If desired a plurality of windings may be substituted in the space for winding 10 as previously noted.

I claim as my invention:

1. In a magnetic flux-shifting actuator the combination of:
   (a) a fixed armature substantially of soft iron;
   (b) a plunger movable relative to said armature to outwardly move and retract a connection to an external load;
   (c) said plunger having a first position in which a gap is formed between said plunger and said armature and said plunger having a second position in which said gap between said plunger and said armature is closed;
   (d) means for forcing said plunger away from said armature to establish said gap;
   (e) a housing for an electromagnet surrounding said armature and having a wall of soft iron;
   (f) a first fixed permanent magnet having a relatively high coercive force so that the polarization thereof is normally unalterable;
   (g) a second fixed permanent magnet having a relatively low coercive force so that the polarization thereof is normally alterable, said second magnet being displaced relative to said first magnet in a direction longitudinally of said armature;
   (h) a first soft iron member engaging one side of said first magnet;
   (i) a second soft iron member engaging the other side of said first magnet;
   (j) said first soft iron member, said plunger, said second soft iron member and said first magnet forming a first flux path;
   (k) a portion of said armature, said second soft iron member, said wall of said housing for an electromagnet, and said second magnet forming a second flux path; and
   (l) an electromagnet in said housing adapted to be energized in opposite directions to change the polarity of said second magnet thereby causing attraction of said plunger by said armature.

2. A magnetic flux-shifting actuator comprising:
   a first magnetic member having an axial dimension;
   a second magnetic member having an axial dimension aligned with said first magnetic member in an end-to-end relationship;
   one of said members being mounted for movement into either of two positions such that in one position the adjacent ends of said members are spaced from one another to form a relatively high-reluctance air-gap and in the second position said adjacent ends are close together to establish a low-reluctance region between said two members;
   first magnetic means alongside of said first magnetic member and arranged to establish therewith a first magnetic circuit having first and second segments communicating respectively with axially-separated first and second regions of said first member;
   said second region being adjacent said first member end;
   second magnetic means alongside of said second magnetic member to establish therewith a second magnetic circuit having third and fourth segments communicating respectively with axially-separated third and fourth regions of said second member;
   said third region being adjacent said second member end;
   said first magnetic circuit including a permanent magnet of high coercivity;
   said second magnetic circuit including a semi-permanent magnet of coercivity lower than said permanent magnet and of such coercivity that the flux polarity of said semi-permanent magnet can readily be reversed by the flux of an applied magnetic field; and
   a coil mounted to supply magnetic flux to said second magnetic circuit to control the magnetization of said semi-permanent magnet;
   said second and third magnetic circuit segments having a common interface so as to provide for establishing, when said one member is in said second position with said adjacent ends close together, a third magnetic circuit serially including portions of said first and second magnetic means and passing through both said first and second members and said low-reluctance region;
   said two magnets being in series with respect to said third magnetic circuit and serving to attract said two magnetic members together to tend to close said air-gap when said semi-permanent magnet is polarized to aid the flux of said permanent magnet;
   said semi-permanent magnet serving to negate such attractive force when polarized oppositely to said permanent magnet as a result of current flow through said coil, whereby said movable magnetic member can be shifted away from said other member by a moderate force on said movable member directed away from said other member.

3. Apparatus as claimed in claim 2, wherein said second magnetic circuit, when said one member is in said second position with said adjacent ends close together, provides a path for the flux produced by said semi-permanent magnet which path is free of said air-gap and also of said permanent magnet so that such path is of relatively low reluctance to allow said semi-permanent magnet readily to be magnetized by flux from said coil when said movable member is to be shifted to said one position.

4. Apparatus as claimed in claim 2, wherein said first magnetic member is mounted for movement in its axial direction;
   said permanent magnet forming part of said first magnetic means.

5. Apparatus as claimed in claim 4, wherein said semi-permanent magnet forms part of said second magnetic member.

6. Apparatus as claimed in claim 2, wherein said first and second magnetic members are cylindrical in configuration.

7. Apparatus as claimed in claim 6, wherein said first and second magnetic means surround said first and second magnetic members, respectively, and are arranged coaxially with respect to said members.

* * * * *